United States Patent [19]

Bonjour et al.

[11] Patent Number: 4,720,217
[45] Date of Patent: Jan. 19, 1988

[54] CUTTER BIT FOR MACHINING BY CHIP REMOVAL

[75] Inventors: Christian Bonjour, Nyon; Charles Hauser, Genolier, both of Switzerland

[73] Assignee: Stellram S.A., Nyon, Switzerland

[21] Appl. No.: 374,738

[22] Filed: May 4, 1982

[30] Foreign Application Priority Data

May 19, 1981 [CH] Switzerland ............... 3247/81

[51] Int. Cl.$^4$ ............................................. B26D 1/00
[52] U.S. Cl. ..................................................... 407/114
[58] Field of Search .................................. 407/113–116

[56] References Cited

U.S. PATENT DOCUMENTS

| | | | |
|---|---|---|---|
| 3,792,515 | 2/1974 | Lundgren | 407/114 |
| 3,875,663 | 4/1975 | Gustafson etal. | 407/114 |
| 3,882,580 | 5/1975 | Lundgren | 407/114 |
| 3,883,748 | 5/1968 | Galimberti et al. | 407/114 |
| 3,885,281 | 5/1975 | Stambler | 407/114 |
| 3,947,937 | 4/1976 | Hertel | 407/114 |
| 4,214,845 | 7/1980 | Mori | 407/114 |
| 4,214,846 | 7/1980 | Kraemer . | |
| 4,359,300 | 11/1982 | Hazra et al. | 407/114 |

FOREIGN PATENT DOCUMENTS

| | | |
|---|---|---|
| 2004477 | 4/1979 | United Kingdom . |
| 2231631 | 2/1973 | Fed. Rep. of Germany . |
| 2309443 | 9/1973 | Fed. Rep. of Germany . |

Primary Examiner—Fred Silverberg
Attorney, Agent, or Firm—Young & Thompson

[57] ABSTRACT

A cutter bit comprising a cutting edge (1), a nose (2) and a chip-breaker (3) formed by a throat situated along the cutting edge. This chip-breaking throat is delimited inwardly of the bit by a heel (6), whose height relative to the bottom of the throat decreases from the nose in a direction toward the center of the bit.

5 Claims, 10 Drawing Figures

CUTTER BIT FOR MACHINING BY CHIP REMOVAL

The present invention relates to cutter bits for machining by chip removal comprising at least one cutting edge, a nose and a chip-breaker. These cutter bits are preferably indexable and may be square, triangular, rhombic or have other shapes.

It is known that bits used for cutting, or for machining by chip removal, of metallic workpieces or the like, should have chip-breakers, provided generally in the form of throats or grooves along the cutting edges, so as to promote the control of said chips. However, present day conditions as to the control of chips and particularly their fragmentation, to facilitate on the one hand the removal of said chips and to improve on the other hand the safety of use of the tools, require an overall study of the tools, so as to satisfy these conditions and, moreover, to decrease the energy consumption in the course of use of said tools. It is also known that the chip-breakers may be of variable width and comprise in their transverse cross section one or more portions, straight or concave, varying as a function of their position along the cutting edge.

The chip-breaking throat generally has a projection to the rear, toward the interior of the bit, at the level of the edge. This is useful when working with shallow depths and short strokes, the chip being then relatively thin and straight. The chip will then rise up along the rear of the throat to be broken and the bit will thus be usable under these conditions. In the case of deep cutting depths and long strokes on the other hand, the cross section of the chip is large and its riding up to the rear as described above is a handicap, impeding the smooth movement of the chip toward natural fragmentation.

The aim of this invention is accordingly to avoid the recited drawback, by providing a cutter bit of the previously-mentioned type whose field of use for deep cutting depths and long strokes will be improved.

The cutter bit for machining by chip removal according to the invention comprises at least one cutting edge, a nose and a chip-breaker formed by a throat situated along the cutting edge, and adapted to achieve the above aim, is characterized by the fact that the chip-breaking throat is bounded inwardly of the plate by a heel, the height of this heel relative to the bottom of the throat decreasing away from the nose in the direction of the interior of the bit.

The accompanying drawings show the invention schematically and by way of example.

Figure 8:
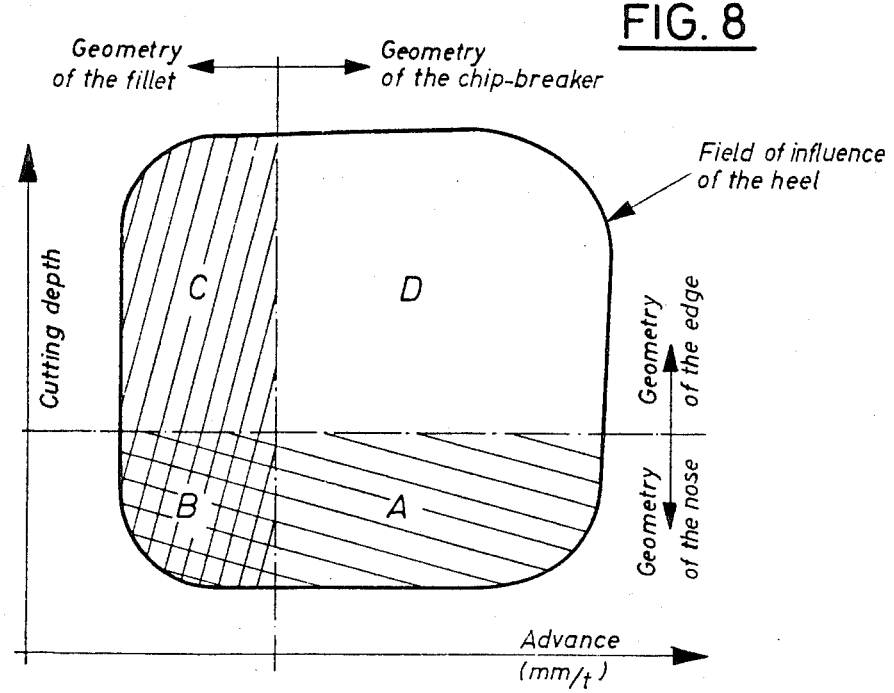
FIG. 8 shows a theoretical closed curve.

The field of utilization of a bit is defined by what is known as a closed curve, which is the region in space for cutting depth, stroke and speed, generally measured at constant speed, in the interior of which the bit breaks and controls the chip correctly. This region, as defined in FIG. 8, may be divided into four principal sub-regions, each of these sub-regions being controlled and principally generated by one portion of the bit.

The above-mentioned aim of the present invention therefore consists in enlarging the region D of the closed curve.

To do this, it is provided that, toward the middle of the cutting edge, the chip should be less impeded, and consequently that the height of the heel should diminish or even disappear.

Figure 1:
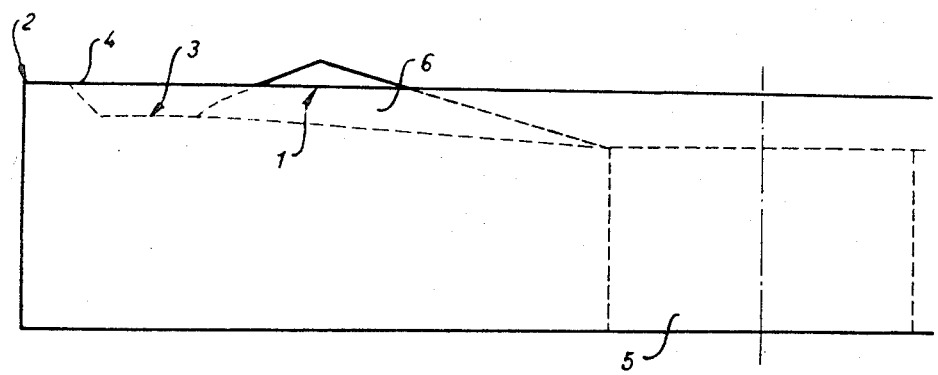
FIG. 1 is a fragmentary side view of a first embodiment of cutter bit according to the invention.
Figure 2:
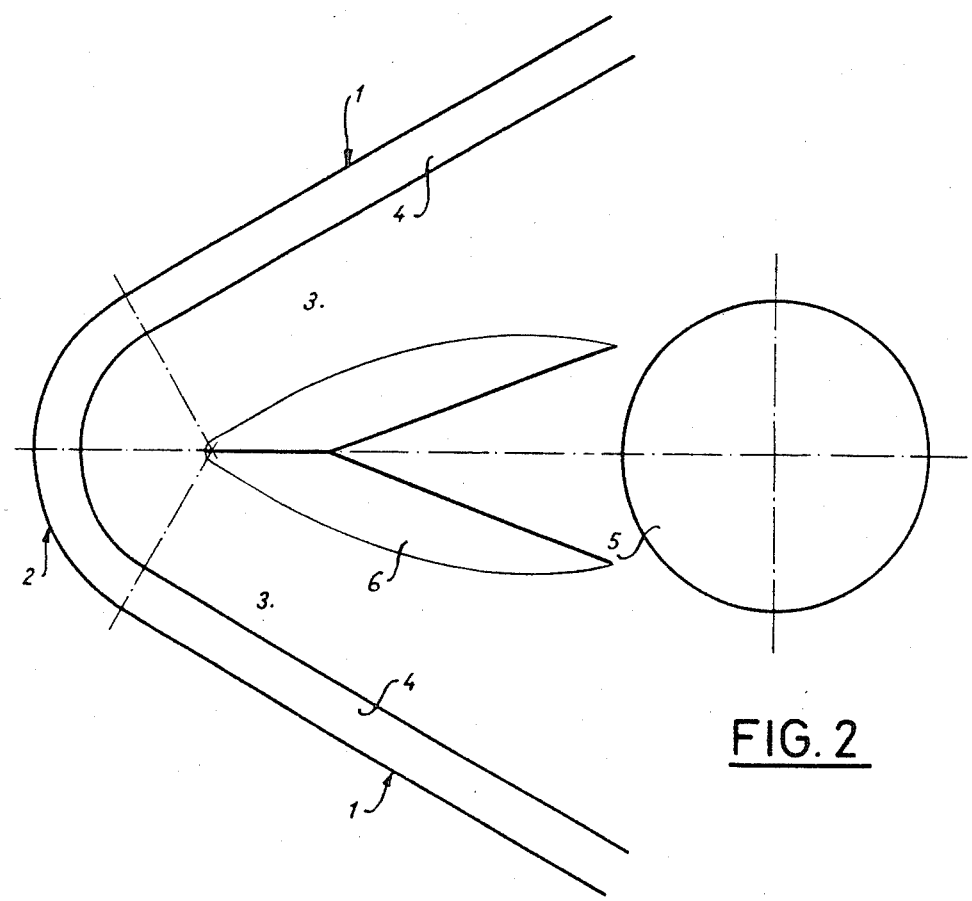
FIG. 2 is a top plan view of the portion of the bit shown in FIG. 1.

In FIGS. 1 and 2 is shown a portion of an indexable triangular cutter bit comprising a cutting edge 1 having straight portions and a curved portion forming a nose or beak 2, a chip-breaker 3 and a fillet 4 disposed between the chip-breaker 3 and the cutting edge 1. Behind nose 2, in the direction of the center of the bit comprised here by a transverse opening 5 adapted to receive a locking element, is disposed a heel 6. The forward portion of this heel 6, adjacent nose 2, rises from the bottom of the chip-breaking throat 3 (see FIG. 1) about to the level of the cutter edge or slightly above, and then declines toward the rear, that is, toward the center of the bit, along a continuous incline. In this embodiment, the heel 6 also has a lateral narrowing in the direction of center of the bit, so as completely to disengage the latter to permit evacuation of the pieces of chips.

Figure 3:
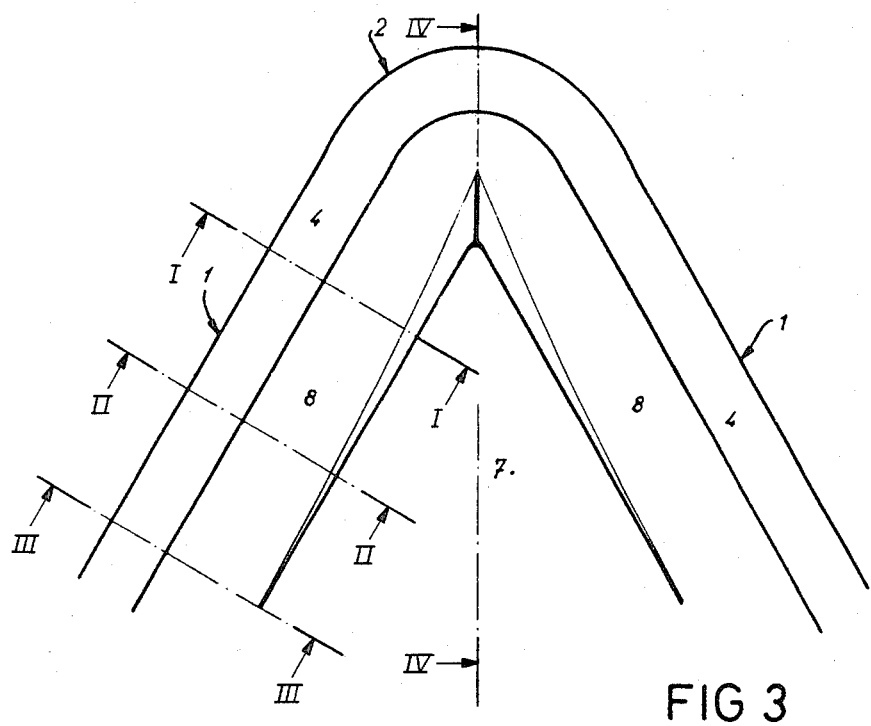
FIG. 3 is a fragmentary plan view of a second embodiment of cutter bit according to the invention.

The second embodiment of cutter bit shown in FIG. 3 comprises a heel 7 which has no lateral narrowing toward the center of the bit, thereby delimiting a chip-breaking throat 8 whose upper edges are parallel.

The sections on lines I—I to IV—IV of FIG. 3 shown respectively in FIGS. 4 to 7A show on the one hand that the wall of heel 7 defining throat 8 is relatively steep and on the other hand that toward the center of the cutting edge 1 the heel 7 has no height, that is rejoins the bottom of the chip-breaking throat 8.

Figure 7A:
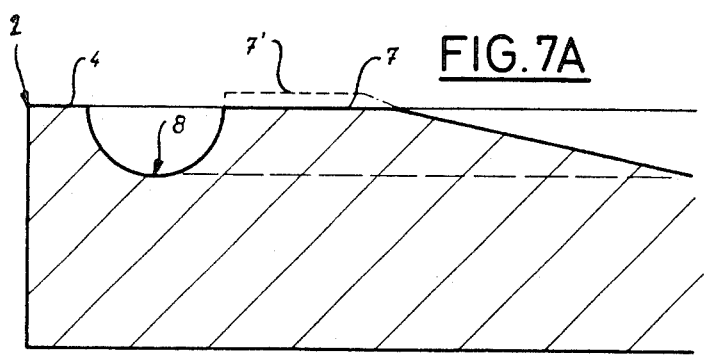
FIGS. 7A and 7B are cross-sectional views on the line IV—IV of FIG. 3 and show two further modifications.
Figure 7B:
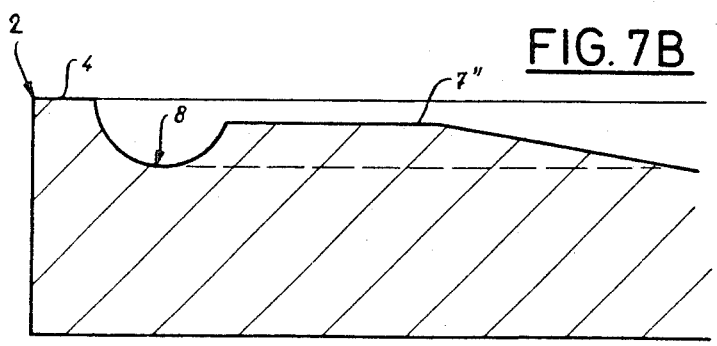
Figure 4:
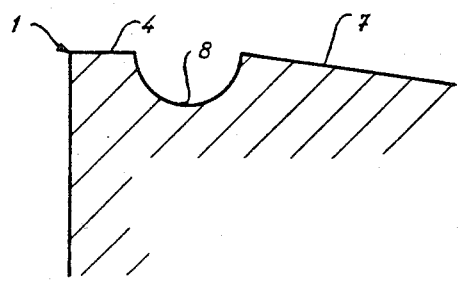
FIGS. 4 to 6 are cross-sectional views on lines I—I, II—II and III—III, respectively of FIG. 3.
Figure 5:
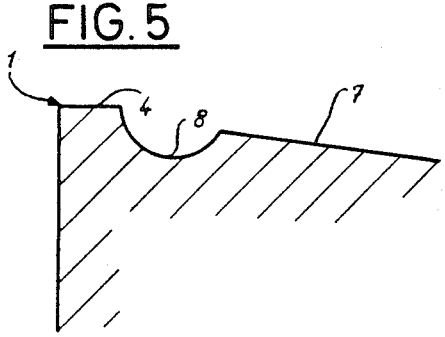
Figure 6:
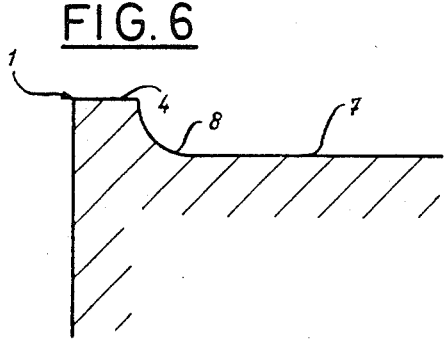

In FIG. 7A is also shown in broken line a first modification of heel 7' whose upper level is situated above that of the cutting edge 1. FIG. 7B shows a second embodiment of heel 7'' in which the upper level of the latter is below the level of cutting edge 1.

Thus the heel 7 or 7' or 7'', has a slope decreasing in the direction of the center of the bit, so as to create a rearward depression giving to the chips freedom to leave and to break.

Figure 9:
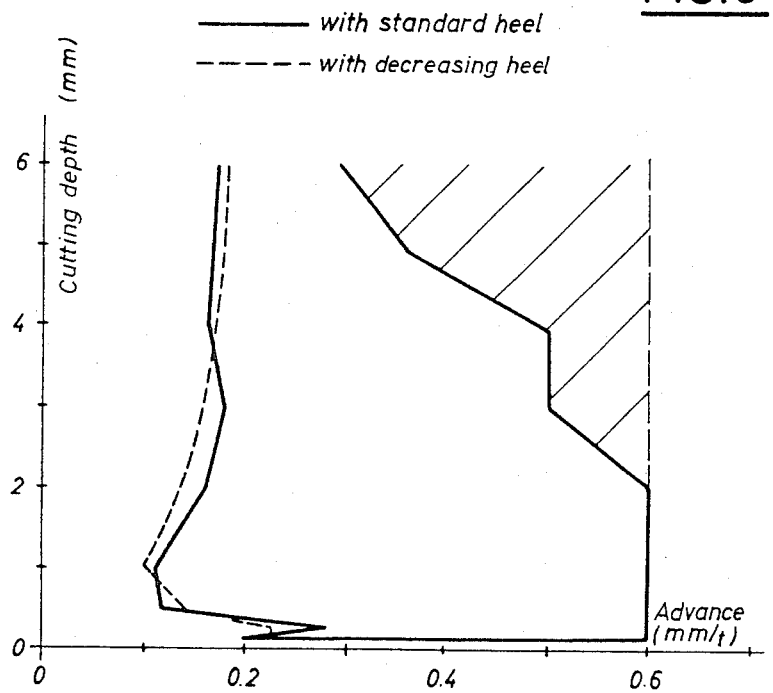
FIG. 9 shows two superposed closed curves obtained respectively with a standard cutter bit and with a cutter bit according to the invention having a diminishing heel.

The result of this decreasing heel is to be seen in the closed curves given in FIG. 9 and obtained with a standard bit with a constant heel on the one hand and with a declining heel on the other hand. It can thus be seen in FIG. 9 that the contraction of the closed curve with a uniform heel disappears when one uses a declining heel. It has moreover been determined that with a cutter bit according to the invention, with a heel declining toward the center, the cutting work is less than that necessary with a constant heel.

Thus, the present invention on the one hand achieves an enlargement of the field of utilization of the cutter bit and on the other hand a decrease in the energy consumption with this bit in the course of a machining operation.

The increase in the field of use may be further extended if a declining heel according to the present invention is combined with a fillet having varying inclination changing from positive or zero inclination at the nose or adjacent the latter to a zero or negative inclination along the cutting edge, as described in our copending application of the same title filed under even date.

What is claimed is:

1. In a cutter bit for machining by chip removal comprising at least one cutting edge, a nose and a chip-breaker formed by a throat disposed along the cutting edge; the improvement in which the chip-breaking throat is bounded toward the interior of the bit by a heel, the height of this heel relative to the bottom of the throat declining from the nose in a direction toward the center of the bit, the heel being pyramidal and being defined on two sides by first surfaces that rise from the throat and that intersect each other along a first line lying in a plane that bisects the nose and that rises in a direction from the nose toward the center of the bit, the heel being defined by a third surface that intersects each of said first surfaces along second lines that meet but diverge from said first line in a direction away from the nose, said second lines being inclined downwardly relative to said cutting edge in a direction away from the nose.

2. Cutter bit according to claim 1, characterized by the fact that the upper level of the heel is above the cutting edge.

3. Bit according to claim 1, characterized by the fact that the width of the chip-breaking throat varies along the cutting edge.

4. Cutter bit according to claim 1, characterized by the fact that the upper level of the heel is at the same height as the cutting edge.

5. Cutter bit according to claim 1, characterized by the fact that the upper level of the heel is below the cutting edge.

* * * * *